(12) United States Patent
Liang

(10) Patent No.: US 7,446,758 B2
(45) Date of Patent: Nov. 4, 2008

(54) DEVICE, SYSTEM AND METHOD FOR AN INPUT DEVICE FOR A COMPUTER

(76) Inventor: Liang Liang, Room 2001A, Area B, Jinhui Building, Nan You Road, Nan Shan District, Shenzhen, Guangdong province (CN)

( * ) Notice: Subject to any disclaimer, the term of this patent is extended or adjusted under 35 U.S.C. 154(b) by 535 days.

(21) Appl. No.: 10/902,736

(22) Filed: Jul. 29, 2004

(65) Prior Publication Data
US 2006/0022936 A1 Feb. 2, 2006

(51) Int. Cl.
*G06F 3/02* (2006.01)

(52) U.S. Cl. .................. 345/169; 345/156; 345/168; 345/169

(58) Field of Classification Search .......... 345/156, 345/168, 169
See application file for complete search history.

(56) References Cited

U.S. PATENT DOCUMENTS

| | | | | |
|---|---|---|---|---|
| 4,414,537 A * | 11/1983 | Grimes | .......... | 341/20 |
| 4,988,981 A * | 1/1991 | Zimmerman et al. | .......... | 345/158 |
| 6,670,894 B2 * | 12/2003 | Mehring | .......... | 341/22 |
| 6,748,281 B2 * | 6/2004 | Alsio | .......... | 700/83 |
| 6,763,320 B2 * | 7/2004 | Kimble | .......... | 702/182 |
| 7,012,593 B2 * | 3/2006 | Yoon et al. | .......... | 345/156 |
| 2004/0036678 A1 * | 2/2004 | Zngf | .......... | 345/168 |

* cited by examiner

*Primary Examiner*—My-Chau T Tran
(74) *Attorney, Agent, or Firm*—Raymond Y. Chan; David and Raymond Patent Firm

(57) ABSTRACT

This invention provides an input device applying to a computer or a mobile telephone, including: glove unit, keys unit, detection unit, coding unit, MPU unit, communication unit, display unit, and power unit. The glove unit is the carrier of the other unit. The detection unit detects the key-press information, the coding unit codes the key-press information and transfers the code to the communication unit, and the communication unit will transfer the information to the computer or the mobile telephone. The MPU watches the work of all the unit and displays correlative information by the display unit, The power unit supply supplies the device electricity, This invention provides a method of constructing the computer network using the device and a fast input method matching the device. This invention provides users the convenience of operating computes and mobile telephones in movement. This device is taken easily, and it has high efficiency and very good reliability.

1 Claim, 7 Drawing Sheets

DEVICE, SYSTEM AND METHOD FOR AN INPUT DEVICE FOR A COMPUTER

BACKGROUND OF INVENTION

At present, Computers have many input methods, in which using a keyboard and a mouse is the most common method. But these methods have some shortcomings.

Firstly, these input methods and devices cannot be good use in movement. Along with the popularization of computers and mobile telephones, more and more people wish to use computers in movement and exchange information by mobile telephones, specially servicemen, policemen and waiters, querying data and inputting data in movement are often needed. But present input methods and devices are not compatible.

Secondly, the present input methods and devices ask the users the special attitude. The users need to sit before a desk equipped with the input device and keep the attitude, which will exhaust users.

The present input methods and devices can make pollution. There are many gaps between keys which can collect much dust and is difficult cleaning.

The present input methods and devices easy to cause false code. Users input data by knocking the present keyboard mechanically, which is easy to cause false operations and low efficiency.

The first goal of this invention is to overcome present shortcomings and to present an input methods and devices easy to be taken and used in movement.

The second goal is to present an input methods and devices ignoring attitudes and environments.

The third goal is to present an input method causing little pollution.

The fourth goal is to present an input methods with high efficiency and very good reliability.

SUMMARY

This invention provides a solution to realize the goals of this invention above-mentioned. An input method and device applying to computers and mobile telephones which is called the glove keyboard system in this paper includes three parts: glove part, keys part, circuit board part, and line.

The circuit board part including coding unit 303, detection unit 304, and MPU unit 310, power unit 308, communication unit 309, display unit 306.

The glove part is a function part taking the shape of a glove. It can be made of all kinds of materials innocuous to people. It can be pulled on the user's hands. It is the carrier of the keys.

The keys spread on the glove part. When an effective key-press takes place, the detection unit will get a signal.

The key can be made of metallic film OR slug OR other electric conductor material, the line is conducting wire.

The key can be made of pervious to light material; the line is optical fiber cluster.

If the key is made of pervious to light material, the detection unit including many of optical receiver and many of Optical transmitter, the Optical transmitter send specially signal, if the optical receiver receive the specially signal, it's mean a key-press action has taken.

The detection unit inspecting whether key-press is effective. It transforms the signal denoting key-press to the signal which can be identified by the coding unit and transmits the signal to the coding unit.

The coding unit makes coding and transmits the data to the communicating unit.

The MPU unit watches the work and displays correlative information on the displays unit.

The communicating unit communicates with the computer or the mobile telephone by a wire or wireless or infrared mode.

The displays indicate the work state of this system.

The power unit offer power, if the communicating mode between the communicating part and the computer or the mobile telephone is wire, the function of the subsystem of the power is that the voltage transmitted by wire can be transformed to the voltage supporting the work of the system. If the communicating mode between the communicating part and the computer or the mobile telephone is wireless or infrared, the subsystem of the power includes the batteries and the power transform part whose function is that the voltage over the batteries can be transformed to the voltage supporting the work of the system.

A computer system applying to the glove keyboard system includes more than one child computers with a glove keyboard and a printer and the center control computer. In this system, the child computers communicate with the center computer in wireless mode.

In the system above-mentioned, users input command into the child computers by the glove keyboard. The child computers can print information by the printer.

An input method by the glove keyboard system is presented. Users pull on the glove keyboard and the mutual contacts between the different parts of the hands is regarded as the key-press information.

In the method above-mentioned, the actual mutual contacts can be the mutual contacts between many parts. The contact used in this device is:

1. the contacts between the thumb and other pasts of the hands;
2. the contact between the first finger and the palm, the contact between the middle finger and the palm, the contact between the ring finger and the palm and the contact between the little finger and the palm;
3. the contact between the back of the right hand and the back of the left hand; and
4. the contact between the given part of the right hand and the given part of the left hand with a slip of them indicates the input signal of the mouse.

DETAILED DESCRIPTION

Figure 1:
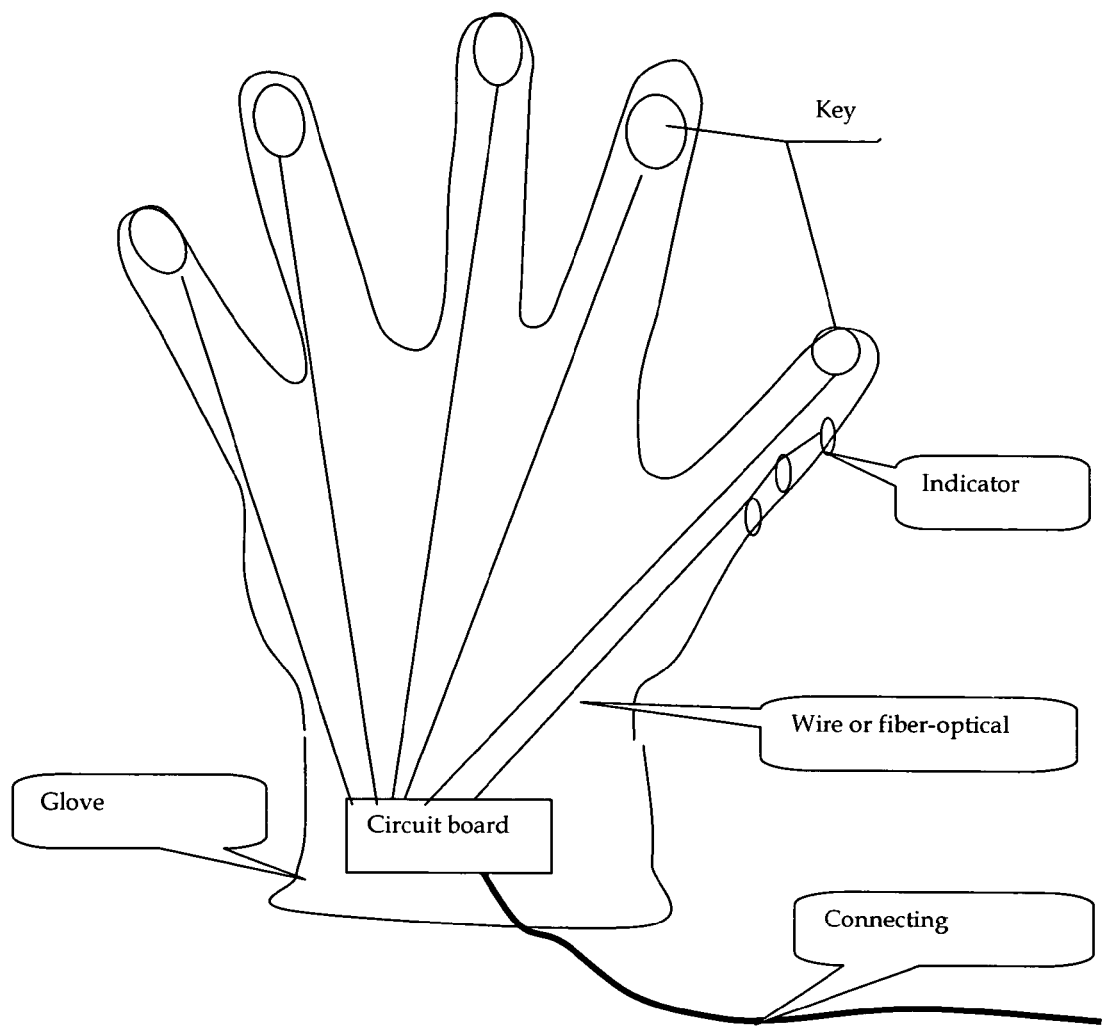
FIG. 1 shows the structure of the glove keyboard system.

FIG. 1 shows the structures of the glove key board system As displayed in the FIG. 1, the glove key board system including following units. A basic glove unit, some keys (more than one), several indicating lights, circuit board, conductor and the device connecting with the computer and the mobile phone.

Figure 2:
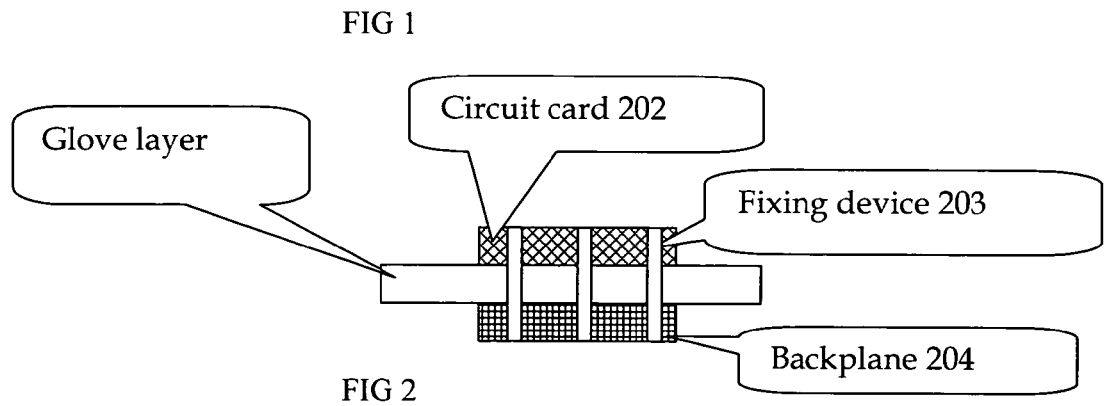
FIG. 2 shows the connection between the glove part, the circuit board and the fixed parts by the connecting set.

FIG. 2 shows the connection between the glove part, the circuit board and the fixed parts by the connecting set, the glove part can be displaced easily.

Figure 3:
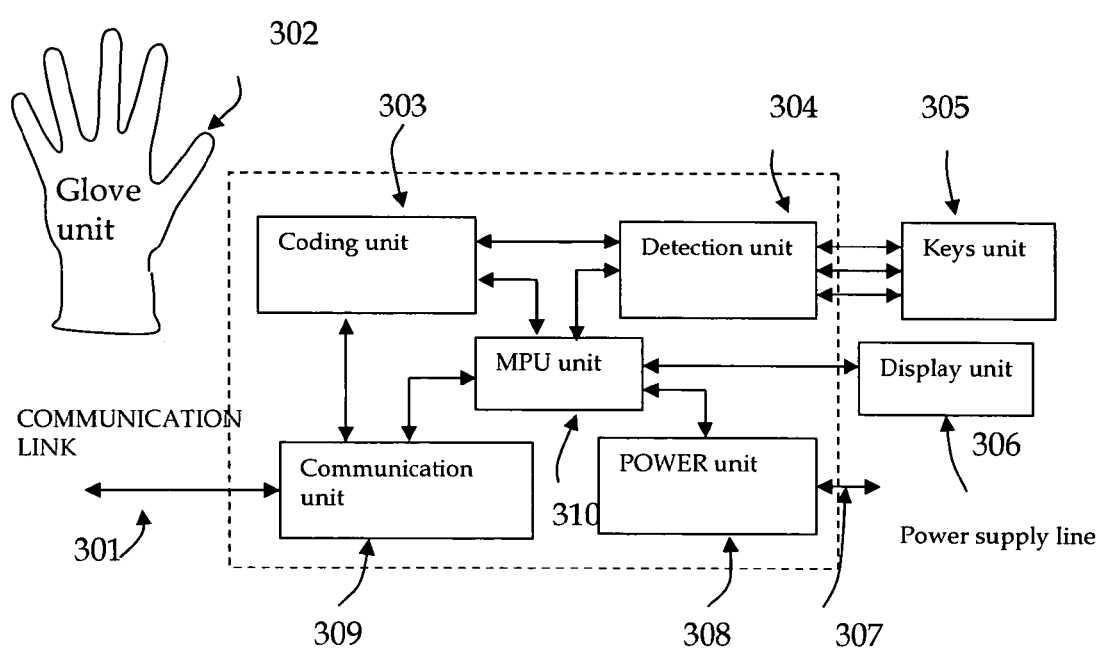
FIG. 3 shows the functions block diagram of the glove keyboard system.

FIG. 3 shows the functions of the glove keyboard system.

Glove unit 302 is the carrier, keys unit 305 distributing on the glove unit 305, communication link 301 links to computer or handset, display unit 306 provide feedback information to user, power supply line 307 supply power from computer or battery.

In the dot line block-diagram, including coding unit 303, detection unit 304, MPU unit 310, power unit 308, communication unit 309.

Detection unit 304 detect the key units unit 305, find the information of key-press, coding unit 303 coding the key-press information, communication unit 309 send the message of key-press to computer, MPU unit 310 manage detection coding communication and display.

Figure 4:
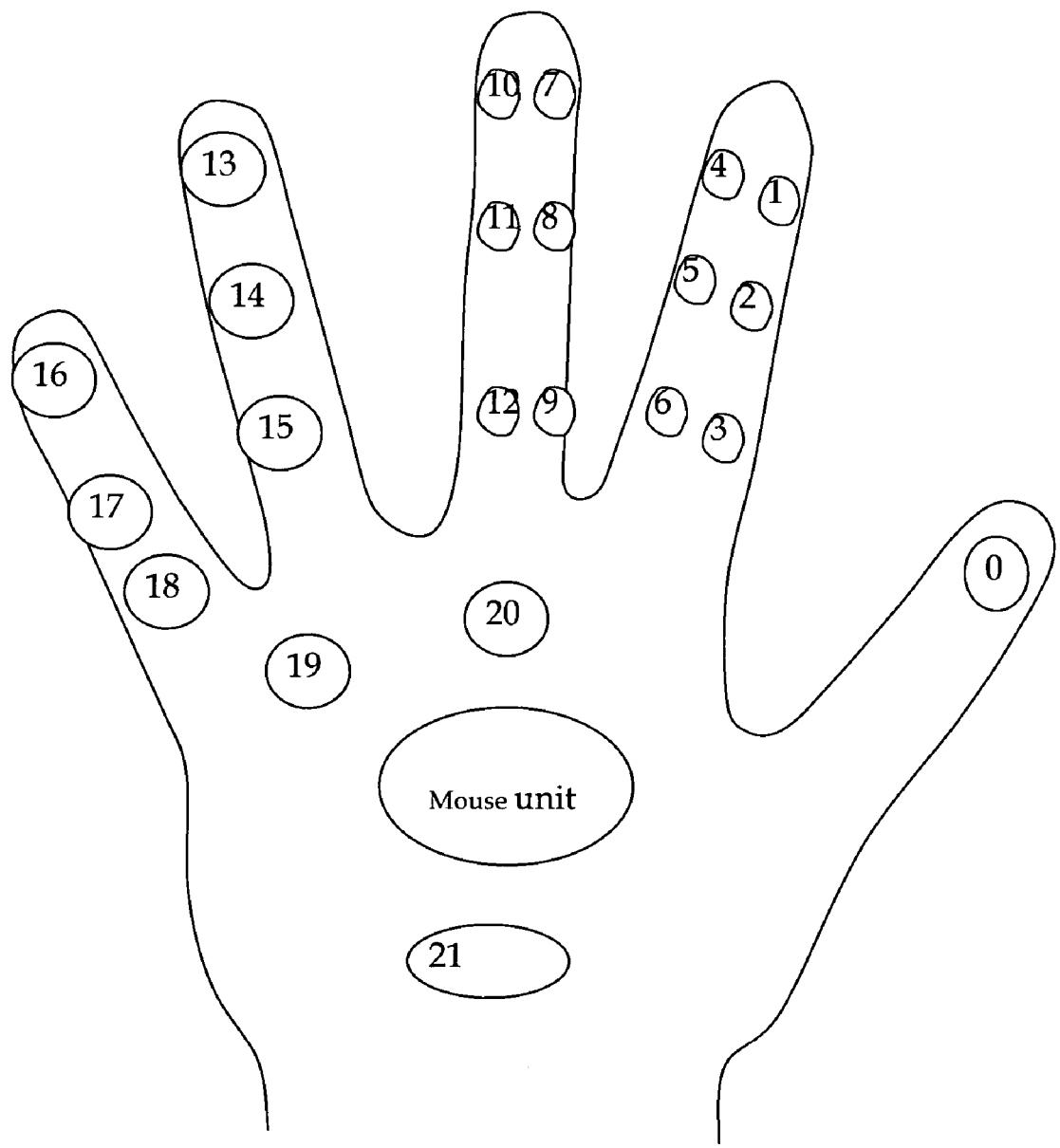
FIG. 4 is the diagrammatic sketch of the key distribution on the palm of the right hand.

FIG. 4 is the diagram of the key distribution on the palm of the right hand.

There are 22 areas to emplace key, and one for mouse unit.

Figure 5:
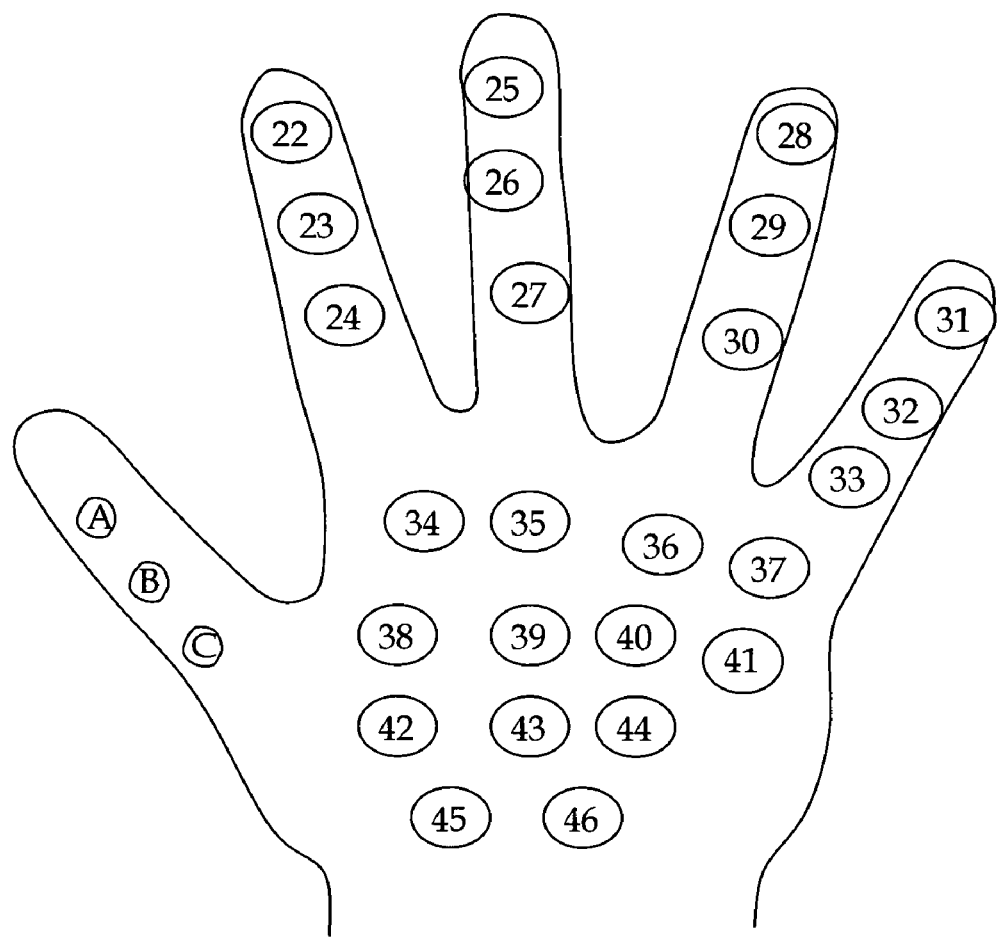
FIG. 5 is the diagrammatic sketch of the key distribution on the back of the right hand.

FIG. 5 is the diagram of the key distribution on the back of the right hand.

There are 23 areas to emplace key and the area a, b, c can emplace switch or some led.

All these are the key subsection, table 1 show the detail.

TABLE 1

| | | key distribution | | |
|---|---|---|---|---|
| 0 | fingertip of thumb | | 1 | the near thumb side of the first forefinger knuckle |
| 2 | the near thumb side of the second forefinger knuckle | | 3 | the near thumb side of the third forefinger knuckle |
| 4 | the obverse of the first forefinger knuckle | | 5 | the obverse of the second forefinger knuckle |
| 6 | the obverse of the third forefinger knuckle | | 7 | the near thumb side of the first middle finger knuckle |
| 8 | the near thumb side of the second middle finger knuckle | | 9 | the near thumb side of the third middle finger knuckle |
| 10 | the obverse of the first middle finger knuckle | | 11 | the obverse of the second middle finger knuckle |
| 12 | the obverse of the third middle finger knuckle | | 13 | the obverse of the first ring finger knuckle |
| 14 | the obverse of the second ring finger knuckle | | 15 | the obverse of the third ring finger knuckle |
| 16 | the obverse of the first little finger knuckle | | 17 | the obverse of the second little finger knuckle |
| 18 | the obverse of the third little finger knuckle | | 19 | the place in palms near the little finger |
| 20 | the place in palms near the ring finger | | 21 | the end of palm where forefinger, middle finger, ring finger, and little finger can contacted |
| 22 | the verso of the first forefinger knuckle | | 23 | the verso of the second forefinger knuckle |
| 24 | the verso of the third forefinger knuckle | | 25 | the verso of the first middle finger knuckle |
| 26 | the verso of the second middle finger knuckle | | 27 | the verso of the third middle finger knuckle |
| 28 | the verso of the first ring finger knuckle | | 29 | the verso of the second ring finger knuckle |
| 30 | the verso of the second ring finger knuckle | | 31 | the verso of the first little finger knuckle |
| 32 | the verso of the second little finger knuckle | | 33 | the verso of the second little finger knuckle |
| 34 | the position near the end of the forefinger at the back of hand | | 35 | the position near the end of the middle finger at the back of hand |
| 36 | the position near the end of the ring finger at the back of hand | | 37 | the position near the end of the little finger at the back of hand |
| 38 | the position near the 34 at the back of hand | | 39 | the position near the 35 at the back of hand |
| 40 | the position near the 34 at the back of hand | | 41 | the position near the 34 at the back of hand |
| 42 | the position near the 34 at the back of hand | | 43 | the position near the 34 at the back of hand |
| 44 | the position near the 34 at the back of hand | | 45 | the position near the 34 at the back of hand |
| A B C | the three paratactic position at the back of the thumb | | | |

The area 0 and area 21 are specific are, when other area contact with area 0 or area 21, the press key massage is generated.

Table 2 show the detail of the way of key-press

TABLE 2 way of key-press

| Contact of two part | Contact of two part | Contact of two part |
|---|---|---|
| A or B or C + 4 | 1 + 0 | 2 + 0 |
| 3 + 0 | 4 + 0 | 5 + 0 |
| 6 + 0 | 7 + 0 | 8 + 0 |
| 9 + 0 | 10 + 0 | 11 + 0 |
| 12 + 0 | 13 + 0 | 14 + 0 |
| 15 + 0 | 16 + 0 | 17 + 0 |
| 18 + 0 | 19 + 0 | 20 + 0 |
| 21 + fingertip | 22 + the other hand fingertip | 23 + the other hand fingertip |
| 24 + the other hand fingertip | 25 + the other hand fingertip | 26 + the other hand fingertip |
| 27 + the other hand fingertip | 28 + the other hand fingertip | 29 + the other hand fingertip |
| 30 + the other hand fingertip | 31 + the other hand fingertip | 32 + the other hand fingertip |
| 33 + the other hand fingertip | 34 + the other hand fingertip | 35 + the other hand fingertip |
| 36 + the other hand fingertip | 37 + the other hand fingertip | 38 + the other hand fingertip |
| 39 + the other hand fingertip | 40 + the other hand fingertip | 41 + the other hand fingertip |
| 42 + the other hand fingertip | 43 + the other hand fingertip | 44 + the other hand fingertip |
| 45 + the other hand fingertip | 46 + the other hand fingertip | A or B or C + 10 |
| 4 + 21 | 10 + 21 | 13 + 21 |
| 16 + 21 | A or B or C + 13 | A or B or C + 16 |

The area 0 can easily touch to the area 1~20 and the areas 22, 23, 25,26,28,29, so there are 28 signal of key press. The areas 4,10,13,16 can easily touch to area 21, so there are 4 signal of key-press; total number of the signals is 32.

A method of detect a key-press action, comprising:

Step D1: set the key of area 0 or are 21 to send signal, the signal maybe a voltage or modulating signal, this signal can be receive by other key receive by touch.

Step D2: detecting the key (ex the key 0 or key 21), find the key which receiving the signal. Send the key-press put down message to computer.

Step D3: detecting the key which receiving the signal, if can't receive the signal, send the key-press key up message to computer.

Step D4: go to step D2.

Figure 6:
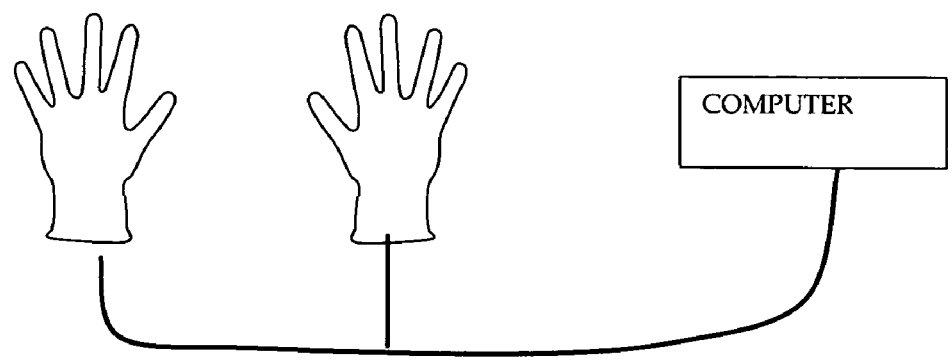
FIG. 6 shows the connection between the both glove keyboard and the computer or the mobile telephone by traditional cables.

FIG. 6 shows the connection between the both glove key-board and the computer or the mobile telephone by traditional cables. It can be the general RS-232 interface or general keyboard interface or USB interface or the data input interface of handset.

Figure 7:
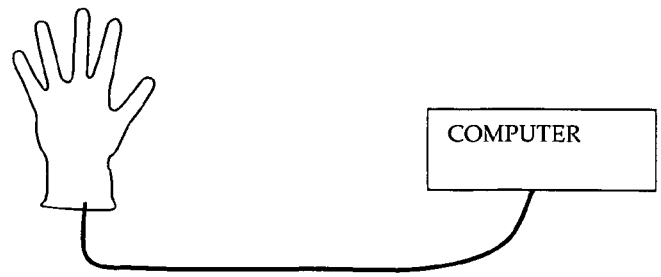
FIG. 7 shows the connection between the single glove keyboard and the computer or the mobile telephone by traditional cables.

FIG. 7 shows the connection between the single glove keyboard and the computer or the mobile telephone by traditional cables.

Figure 8:
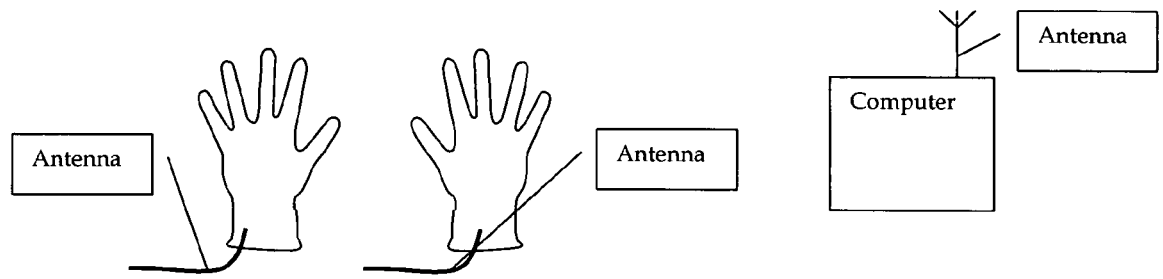
FIG. 8 shows the connection between the both glove keyboard and the computer or the mobile telephone by wireless.

FIG. 8 shows the connection between the both glove key-board and the computer or the mobile telephone by wireless. The wireless can be the Bluetooth or AM and all so.

Figure 9:
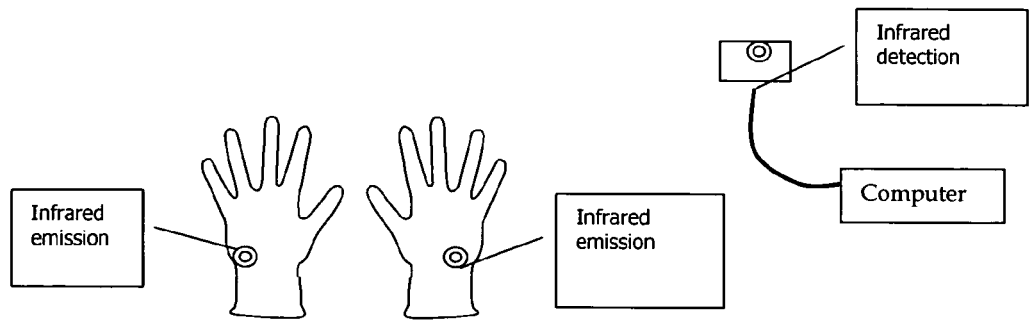
FIG. 9 shows the connection between the glove keyboard and the computer or the mobile telephone in infrared mode.

FIG. 9 shows the connection between the glove keyboard and the computer or the mobile telephone in infrared mode.

When the connection is wireless or infrared, a battery is need.

Figure 10:
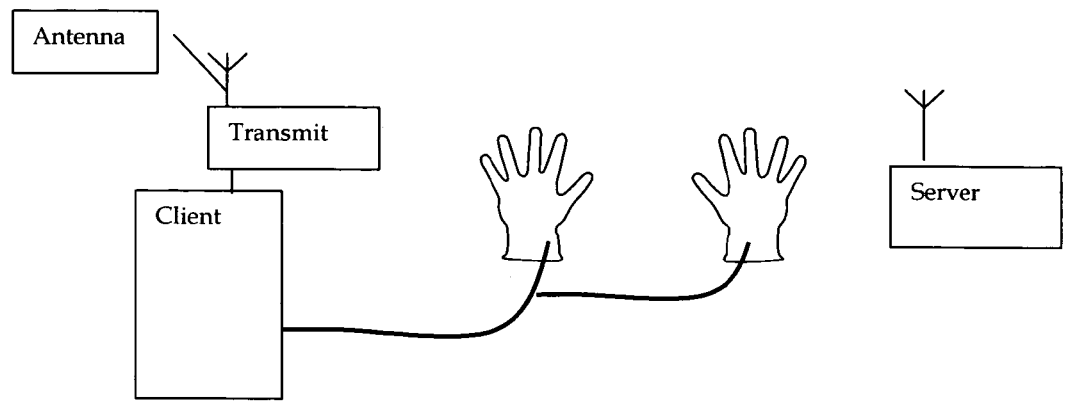
FIG. 10 shows the method of constructing the computer network using the moving computer with glove keyboard.

FIG. 10 shows the method of constructing the computer network using the glove keyboard.

In FIG. 4, it has an area for mouse unit in the glove keyboard, the moving of the mouse is controlled by the other hand's fingertip, and then mouse moving information can be produced.

FIG. 10 shows an application of the glove key-board in this application: a computer with the glove keyboard can print some useful things such as some kinds of the ticket, also the computer can, connect to the server wirelessly.

Figure 11:
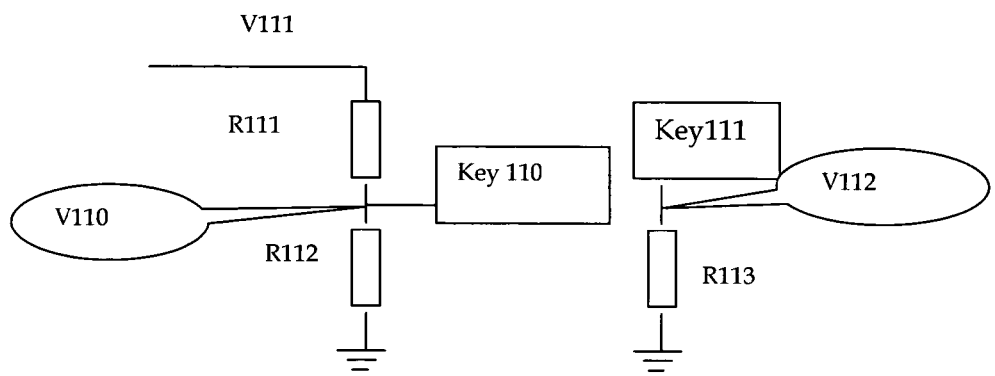
FIG. 11 shows a kind of method to detect the key-pressed.

FIG. 11 shows a kind of method to detect the key-pressed. When the Key110 touch with the key111, the volt at the v110 point will change form the V111 R112☐ (R111+R112) to V111 R123☐☐R111+R123☐, the volt at the v112 point will change form the 0 to V111 R123☐☐R111+R123☐, the R123 equal to parallel connection of R111 and R112. When the Key110 leave with the key111, the volt at the v110 point will change form the V110 R123☐☐R111+R123☐ to V110 R112☐☐R111+R112, the volt at the v112 point will change form the V111 R112☐☐R111+R112☐ to 0 the By this method key-pressed information is detected.

Figure 12:
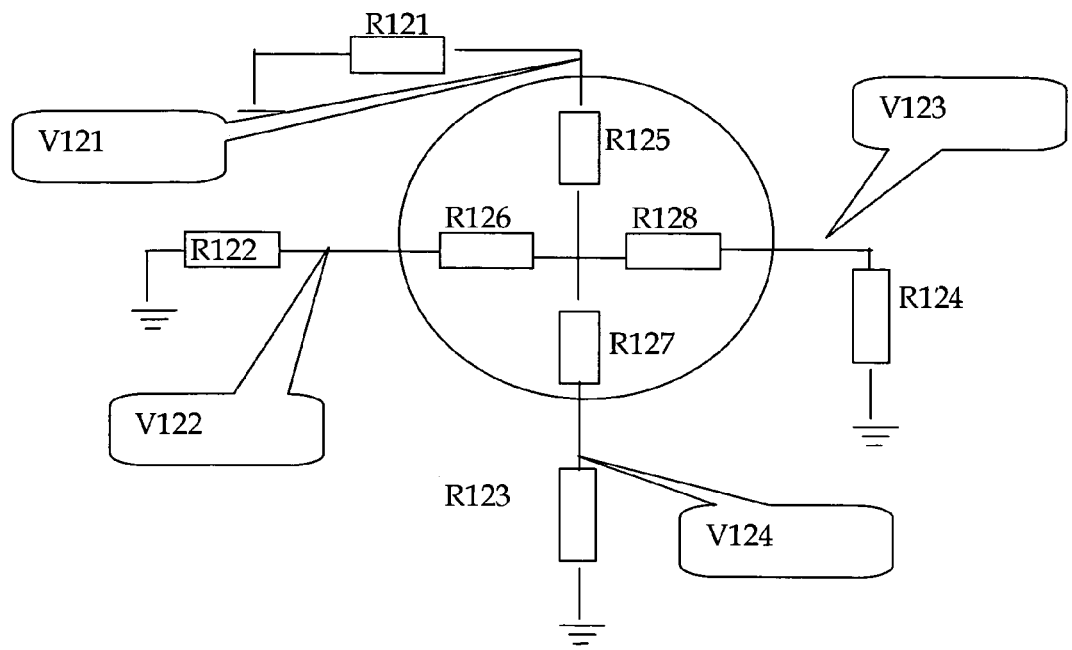
FIG. 12 shows the concept of the mouse device in this invention.

FIG. 12 shows the concept of the mouse device. There is a semiconductor planet when the electrode moving on this planet, the planet can equal to a model with four variable resistances. The volt v121, v123 v124, v122 can change with the moving of the mouse. The volt can be detected by the detect unit, the MPU unit can compute the speed and the direction of the electrode, the information can be coded and can be sent to computer.

The glove keyboard supply change the array of key one can determining the key array by this way:

Step 1 designing a key array,

Step 2 wakening the input device to come into the status of setting key array,

Step 3 transferring the data of the key array mentioned in step 1 to the input device, Step 4 making the input device work according to the new key array.

Figure 13:
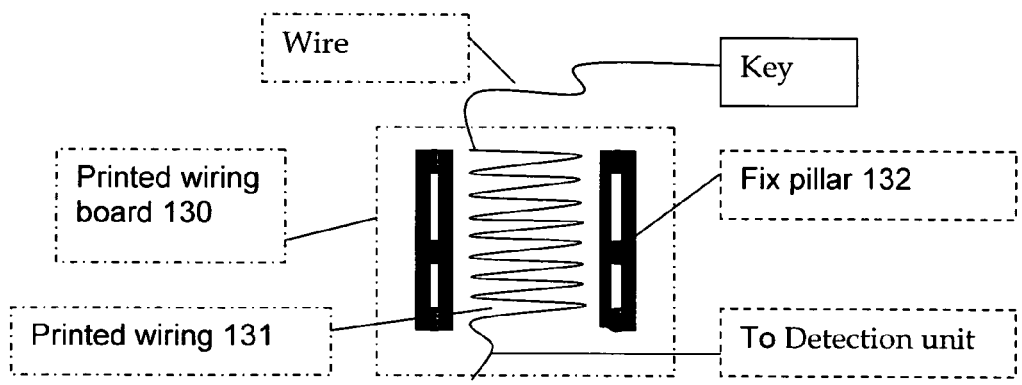
FIG. 13 shows the method of electrostatic discharge.

FIG. 13 show the method of electrostatic discharge, in this invent, the key make of conduct material is connected with the circuit board, so electrostatic is the big trouble, see the FIG. 2, backplane 204 is made contact with the skin of the user, fixing device 203 is make of conduct material, see the FIG. 13, on the circuit board, fix pillar 132 and printed wiring 131 contact with backplane 204, printed wiring 131 connect with the wire, the wire connect with the key. The electrostatic can easy Coupling to fix pillar 132, releasing to the skin of the user.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

What is claimed is:

1. An inputting device for a computer or mobile telephone, comprising:
   a glove part for affixing on a user hand;
   a keys part wherein said key part is connected or in proximity to another key part on said glove part and a mean to sense a key-press action of said key part;
   a circuit board part is affixed on said glove part, wherein the circuit board includes a detection unit, a coding unit, and a communicating unit;
   a plurality of wire for connecting said keys part and said circuit board,
   wherein said detection unit inspects whether said key-press action is effective, transforms said key-press action to said signal, and transmits said signal to said coding unit;
   wherein said coding unit identify and transform said signal from said detection unit to a coding data and transmits said data to said communicating unit;

wherein said circuit board is electro-connected to a backplane with a fix pillar; wherein said backpane is in contact with a skin of a user; and wherein electrostatic discharge from said circuit board is coupled to said fix pillar and released through said backplane to the skin of the user.

* * * * *